US006559622B2

(12) United States Patent
Mooney

(10) Patent No.: US 6,559,622 B2
(45) Date of Patent: May 6, 2003

(54) SYSTEM FOR PREVENTING OVERREACH OF PROTECTION FOR SERIES COMPENSATED POWER LINES

(75) Inventor: Joseph B. Mooney, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 09/899,892

(22) Filed: Jul. 6, 2001

(65) Prior Publication Data

US 2003/0011951 A1 Jan. 16, 2003

(51) Int. Cl.[7] .............................. G05F 1/70; G05F 3/00
(52) U.S. Cl. ........................................ 323/209; 323/211
(58) Field of Search ................................ 323/208, 209, 323/210, 211

(56) References Cited

U.S. PATENT DOCUMENTS 5,392,184 A * 2/1995 Unterlass et al. ............. 361/15
5,489,838 A * 2/1996 Leowald et al. ............ 323/209
6,331,765 B1 * 12/2001 Yamamoto et al. ........... 323/10

* cited by examiner

Primary Examiner—Bao Q. Vu
(74) Attorney, Agent, or Firm—Jensen & Puntigam, P.S.

(57) ABSTRACT

The system includes an enable signal applied to an output AND element. A comparator compares the voltage ratio of selected measured and calculated phase-to-phase or single phase voltages against a threshold value. An AND gate is responsive to a high signal from the comparator and indications of a three pole open condition, a single pole open condition for selected poles, and a loss of potential condition. A high output from the AND gate is applied to a timer, which produces a high output for a short period of time, which controls the output element. The output element provides a blocking signal for the protective elements under particular conditions and a permissive signal under other conditions.

7 Claims, 1 Drawing Sheet

SYSTEM FOR PREVENTING OVERREACH OF PROTECTION FOR SERIES COMPENSATED POWER LINES

TECHNICAL FIELD

This invention relates generally to series compensated electric power lines, and more specifically concerns a system for preventing zone 1 protection for the line from operating for faults outside of the protected zone.

BACKGROUND OF THE INVENTION

It is well known to use compensation in the form of series connected capacitors in a power line in order to transmit more power along the line. The amount of capacitance will determine the percentage of compensation for the otherwise inductive power line. Fifty percent (50%) compensation is a common example, which results in the power line looking 50% shorter electrically. The individual capacitors are lumped together in one location on the line. Because the capacitance reactance is lumped, there is a large discontinuity in the line impedance, i.e. the ohmic value per mile changes significantly for faults on either side of the capacitance.

Series compensation by adding capacitance in effect changes the appearance of the location of faults for conventional protective elements such as distance elements, which are typically used to determine the distance from a protective device such as a relay to the fault. Typically, a distance relay measures the impedance to the fault by using a phase angle comparator, measuring the angle between a polarizing or reference voltage V and a calculated voltage value $[r \cdot Z \cdot I] - V$, where r is a scalar value, and $Z = R + jX_L - jX_C$. I is the measured loop current and V is the measured loop voltage. If the angle between the two voltages is less than 90°, the fault is internal, while if the angle is greater than 90°, the fault is external. An angle of 90° indicates the fault is on the boundary.

However, the presence of the series capacitance may cause the zone 1 protection of the relay to overreach, resulting in a potential misoperation. Accordingly, it is desirable to be able to block the trip operations of zone 1 protective elements until it is accurately determined that the fault is in fact between the relay and the series capacitor, i.e. the fault is internal to the line portion protected by the relay.

DISCLOSURE OF THE INVENTION

Accordingly, the present invention is a system for preventing overreaching of zone 1 protection for a series compensated power line, comprising: a comparator for comparing a ratio value of preselected power system voltage quantities with a preselected threshold ratio value; a timing device responsive to a comparator signal to produce a timer output signal for a limited time, when the ratio value is less than the threshold value; and an output element, when enabled, responsive to the timer output signal to produce a blocking signal for the protective elements for the power line.

BRIEF DESCRIPTION OF THE DRAWINGS

FIG. 2 is a logic diagram showing the operation of the system of the present invention for AB phase-to-phase loop. BC and CA loops are similar.

FIG. 3 is a diagram showing the operation of the system of the present invention for A phase-ground loop. B phase-ground and C phase-ground loops are similar.

BEST MODE FOR CARRYING OUT THE INVENTION

Figure 1:
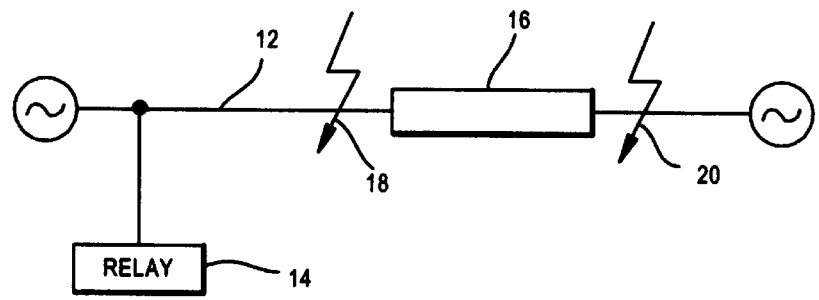
FIG. 1 is a sampled compensated power line portion.

FIG. 1 shows a simplified diagram of a power line portion 12 of an electric power system, with power line portion 12 protected by a protective relay 14 which, for example, includes distance elements for determining the distance from the relay 14 to a fault. The power line 12 is compensated by a series capacitance 16 which, as indicated above, is used as compensation for the inductive line 12 in order to permit an increase in transmitted power along the line. The compensation in effect makes the power line look shorter electrically than it actually is physically. The series capacitance 16 in the embodiment shown is located at the end of line portion 12.

Relay 14 includes a preestablished zone 1 reach of protection along line portion 12. Zone 1 reach will encompass fault 18 on line portion 12. The result of the operation of the system of the present invention is to block the relay distance elements temporarily from declaring a fault beyond capacitance 16, such as at 20, since that would be beyond the established zone 1 reach. In the illustrated example, zone 1 protection covers the distance from relay 14 to a small distance in front of series capacitance 16. The system of the present invention uses selected voltage and current quantities as well as the value of the compensating capacitance to determine, in a dynamic way, whether or not the output of particular protective elements should be blocked to prevent possible misoperation.

Figure 2:
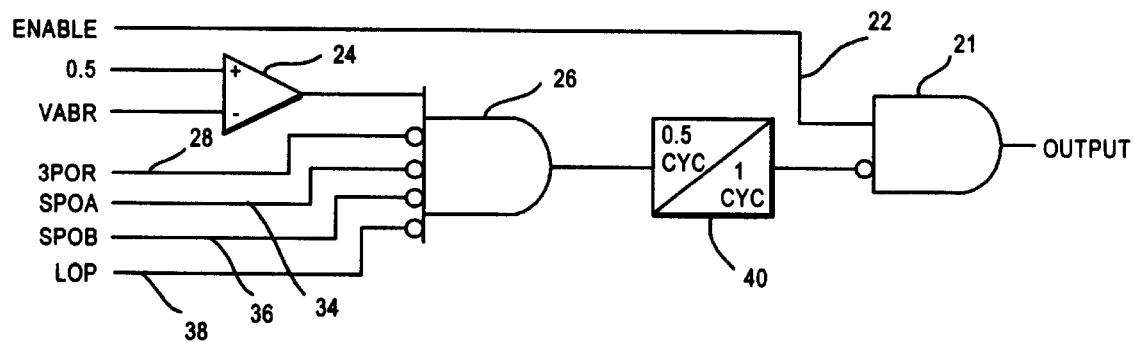

FIG. 2 shows a circuit for determining whether the output of the AB phase-to-phase distance element should be blocked. Similar circuits are for the BC phase-to-phase element and the CA phase-to-phase element.

Figure 3:
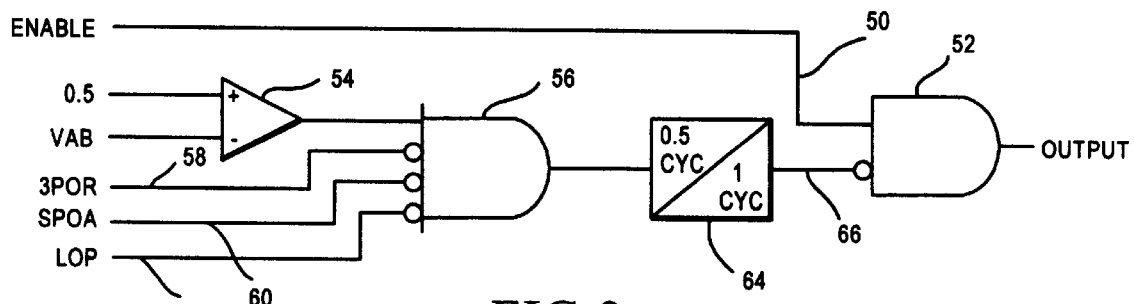

FIG. 3 shows a circuit for determining whether the A phase element should be blocked. Similar circuits are provided for B phase and C phase elements. The circuits of FIGS. 2 and 3 use the following voltage ratio inputs:

$$V_{ABR} = \frac{|V_{AB}|}{|(I_{AB} \cdot Z_{1MAG} \angle Z_{1ANG}) + (I_{AB} \cdot -jX_c)| + 0.001}$$

$$V_{BCR} = \frac{|V_{BC}|}{|(I_{BC} \cdot Z_{1MAG} \angle Z_{1ANG}) + (I_{BC} \cdot -jX_c)| + 0.001}$$

$$V_{CAR} = \frac{|V_{CA}|}{|(I_{CA} \cdot Z_{1MAG} \angle Z_{1ANG}) + (I_{CA} \cdot -jX_c)| + 0.001}$$

$$V_{AR} = \frac{|V_A|}{|[(I_{AL} + I_{GL} \cdot k0M1 \angle k0A1) \cdot Z_{1MAG} \angle Z_{1ANG}] + (I_{AL} \cdot -jX_c)| + 0.001}$$

$$V_{BR} = \frac{|V_B|}{|[(I_{BL} + I_{GL} \cdot k0M1 \angle k0A1) \cdot Z_{1MAG} \angle Z_{1ANG}] + (I_{BL} \cdot -jX_c)| + 0.001}$$

$$V_{CR} = \frac{|V_C|}{|[(I_{CL} + I_{GL} \cdot k0M1 \angle k0A1) \cdot Z_{1MAG} \angle Z_{1ANG}] + (I_{CL} \cdot -jX_c)| + 0.001}$$

$Z_{1MAG}$ and $Z_{1ANG}$ are user settings for the magnitude and angle of the replica line impedance. $I_{AL}$, $I_{BL}$, $I_{CL}$, $I_{AB}$, $I_{BC}$ and $I_{CA}$ are sequence, phase and phase-to-phase current quantities ($I_G$ is the combination of phases $I_A$, $I_B$ and $I_C$). $V_A$, $V_B$, $V_C$, $V_{AB}$, $V_{BC}$ and $V_{CA}$ are sequence, phase and phase-to-phase voltages. k0A and k0M are angle and magnitude values for the zero sequence function:

$$\frac{Z_0 - Z_1}{3Z_1}$$

FIG. 2 shows the use of the AB phase-to-phase equations (voltage ratio $V_{ABR}$) in providing an output determination for blocking the operation of the AB protective element(s). Similar circuits are used to block the BC and CA elements.

FIG. 2 includes an AND gate 21, which is enabled by a user setting on line 22 indicating that the relay is functioning on a series compensated line and that the present overreach prevention system should be used. FIG. 2 also shows a comparator 24. Comparator 24 is responsive to the $V_{ABR}$ voltage ratio quantity provided above and compares it to a threshold of 0.5. If ratio value $V_{ABR}$ is less than 0.5, the output of comparator 24 is high. The 0.5 value is somewhat arbitrary. Other values could be used in the range of 0–0.75.

AND gate 26 is responsive to the output of comparator 24 and also to four other inputs in the embodiment shown. One input to AND gate 26, on line 28, indicates a three pole open in the power system, i.e. all three phases A, B and C are open. Line 34 is high if there is a single pole open for phase A; line 36 is high if there is a single pole open for phase B; and line 38 is high if there is a loss of potential condition or a blown VT fuse on the line. In other embodiments, however, different combinations of the inputs on lines 28, 34, 36 and 38 can be used. It is also possible to use none of those inputs.

The output of AND gate 26 is high if the output of comparator 24 is high and the signals on lines 28, 34, 36, and 38 to the NOT inputs of AND gate 26 are all low, meaning that none of the poles are open and that there is no loss of potential condition indicated. The output of AND gate 30 in such a case is applied to a 0.5 cycle pick-up, one cycle drop-out timer 40. Thus, after AND gate 26 is high for half a cycle, the output of timer 40 will pick up, go high, and remain high for one cycle after the output of AND gate 26 goes low. Otherwise, output of timer 40 is low, i.e. when any one of the signals on lines 28, 34, 36 and 38 are high or when the output of comparator 24 is low ($V_{ABR}$ is greater than 0.5).

When the output of timer 40 is low and there is an enable signal on line 22 to AND gate 21, the output of AND gate 21 goes high, which is a permissive output permitting the relay to trip the associated circuit breaker by action of the zone 1 AB distance element. When the output of timer 40 is high, conversely, the output of AND gate 21 goes low, which acts as a blocking signal for the AB distance element.

FIG. 3 shows a similar circuit for use for A phase elements. Again, a user provided enable signal is applied on line 50 to output AND gate 52 indicating that the circuit of FIG. 3 is operative, because of a series compensated line. A comparator 54 is responsive to the voltage ratio value $V_{AR}$, as defined above. The output of comparator 54 is applied as an input to AND gate 56. AND gate 56 is also responsive to three other inputs on input lines 58, 60, and 62. Line 58 indicates the presence of a three pole open, while line 60 indicates a single pole open for phase A. Line 62 indicates a loss of potential condition or blown fuse condition. The output of AND gate 56 will be high when the output of comparator 54 is high and the inputs on lines 58, 60, and 62 are all low, indicating that none of the poles are open and that there is no loss of potential condition or blown fuse. Again, various single inputs, combinations or none of the inputs from line 58, 60 and 62 could be used.

The output of AND gate 56 is applied to a 0.5 cycle pick-up, one cycle drop-out timer 64. The output of timer 64 is applied on input line 66 to a NOT input of output AND gate 52. When the output of timer 64 is low, and there is an enable signal on line 50, the output of AND gate 52 is high, which is a permissive signal for the A phase element, permitting a trip signal. When the output of timer 64 is high, the output of AND gate 52 is low, which blocks the A phase protective element from asserting.

Hence, a system has been disclosed which is designed to prevent overreaching of zone 1 protection elements for series compensated power lines. The operation of the zone 1 protective elements are blocked until it is determined that the fault lies between the relay and the series capacitor compensation.

While a preferred embodiment of the invention has been disclosed for purposes of illustration, it should be understood that various changes, modifications and substitutions may be incorporated in the embodiment without departing from the spirit of the invention which is determined by the claims which follow:

What is claimed is:

1. A system for preventing overreaching of zone 1 protection for a series compensated power line, comprising:
   a comparator for comparing a ratio value of preselected power system voltage quantities from the power line with a preselected threshold ratio value;
   a timing device responsive to an output signal from the comparator to produce a first timer output signal for a limited time when the ratio value is less than the threshold value; and
   an output element responsive to the first timer output signal and an enable signal to produce a blocking signal for the protective elements for the power line, wherein when there is no first timer output signal, the protective elements are permitted to provide a trip signal.

2. A system of claim 1, including a logic element responsive to the comparator and to at least one of the following conditions: an indication of a three pole open signal, an open pole signal for the preselected voltage quantities and a lack of potential condition on the line to produce a first logic output to prevent the timer output signal, thereby permitting a trip signal, when at least one of said conditions is present or the ratio value is greater than the threshold value.

3. A system of claim 1, wherein the preselected voltage quantities are phase-to-phase quantities and the output element blocks corresponding phase to phase elements.

4. A system of claim 1, wherein the preselected voltage quantities are single phase voltages and the output element blocks the corresponding phase elements.

5. A system of claim 1, wherein the timing device is a timer having a 0.5 cycle pick-up and a one cycle drop-out operating characteristic.

6. A system of claim 1, wherein the value of the capacitance used in compensation of the power line is used in the termination of the voltage quantities, such that the reach of zone 1 is dynamic in nature, taking into account automatically the actual value of the compensation capacitance.

7. A system of claim 1, wherein said ratio is in the range of 0–0.75.

* * * * *